United States Patent
Yang et al.

(10) Patent No.: US 9,298,369 B2
(45) Date of Patent: Mar. 29, 2016

(54) MODIFY PRIORITY OF DATASET BASED ON NUMBER OF TIMES THE DATA SET IS PROCESSED BY BOTH A DATA DETECTOR CIRCUIT AND A DATA DECODER CIRCUIT

(71) Applicant: LSI Corporation, Milpitas, CA (US)

(72) Inventors: Shaohua Yang, San Jose, CA (US); Fan Zhang, Milpitas, CA (US); Jun Xiao, Fremont, CA (US); Kaitlyn T. Nguyen, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 446 days.

(21) Appl. No.: 13/766,874

(22) Filed: Feb. 14, 2013

(65) Prior Publication Data

US 2014/0229954 A1 Aug. 14, 2014

(51) Int. Cl.
*G06F 9/46* (2006.01)
*G06F 3/06* (2006.01)

(52) U.S. Cl.
CPC .................................. *G06F 3/06* (2013.01)

(58) Field of Classification Search
None
See application file for complete search history.

(56) References Cited

U.S. PATENT DOCUMENTS

| 6,157,963 | A * | 12/2000 | Courtright et al. ................. 710/5 |
| 7,113,356 | B1 | 9/2006 | Wu |
| 7,424,077 | B2 | 9/2008 | Yang |
| 2003/0088834 | A1 | 5/2003 | Murakami |
| 2006/0256670 | A1 | 11/2006 | Park |
| 2009/0273492 | A1 * | 11/2009 | Yang et al. ....................... 341/81 |
| 2010/0053787 | A1 * | 3/2010 | Mathew et al. ................. 360/29 |
| 2011/0164669 | A1 | 7/2011 | Mathew |
| 2013/0016846 | A1 | 1/2013 | Tan et al. |

OTHER PUBLICATIONS

U.S. Appl. No. 13/602,535, filed Sep. 4, 2012, Fan Zhang, Unpublished.
U.S. Appl. No. 13/602,463, filed Sep. 4, 2012, Fan Zhang, Unpublished.
U.S. Appl. No. 13/561,230, filed Jul. 30, 2012, Fan Zhang, Unpublished.
U.S. Appl. No. 13/597,026, filed Aug. 28, 2012, Fan Zhang, Unpublished.
U.S. Appl. No. 13/558,245, filed Jul. 25, 2012, Fan Zhang, Unpublished.
U.S. Appl. No. 13/560,702, filed Jul. 27, 2012, Fan Zhang, Unpublished.
U.S. Appl. No. 13/552,403, filed Jul. 18, 2012, Fan Zhang, Unpublished.
U.S. Appl. No. 13/400,750, filed Feb. 21, 2012, Fan Zhang, Unpublished.
U.S. Appl. No. 138433,742, filed Mar. 29, 2012, Fan Zhang, Unpublished.
U.S. Appl. No. 13/342,240, filed Jan. 3, 2012, Shaohua Yang, Unpublished.
U.S. Appl. No. 13/316,953, filed Dec. 12, 2011, Haitao Xia, Unpublished.

(Continued)

*Primary Examiner* — Wissam Rashid

(57) ABSTRACT

Systems, circuits, devices and/or methods related to systems and methods for data processing, and more particularly to systems and methods for quality based scheduling processing of data sets. In some cases, a priority indication associated with a data set is modified based upon one or more factors. As an example, the priority indication may be modified based upon a number of times that a given data set processed through both a data detector circuit and a data decoder circuit.

19 Claims, 4 Drawing Sheets

(56) References Cited

OTHER PUBLICATIONS

U.S. Appl. No. 13/340,974, filed Dec. 30, 2011, Dan Liu, Unpublished.

U.S. Appl. No. 13/445,848, filed Apr. 12, 2012, Bruce Wilson, Unpublished.

U.S. Appl. No. 13/251,342, filed Oct. 3, 2011, Haitao Xia, Unpublished.

* cited by examiner

MODIFY PRIORITY OF DATASET BASED ON NUMBER OF TIMES THE DATA SET IS PROCESSED BY BOTH A DATA DETECTOR CIRCUIT AND A DATA DECODER CIRCUIT

FIELD OF THE INVENTIONS

Systems, circuits, devices and/or methods related to systems and methods for data processing, and more particularly to systems and methods for quality based scheduling processing of data sets.

BACKGROUND

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. In some cases, the data processing function uses a variable number of iterations through a data detector circuit and/or data decoder circuit depending upon the characteristics of the data being processed. Each data set is assigned a priority which may be the same across all data sets that is used in scheduling processing. Such may conclude without resolving all errors.

Hence, for at least the aforementioned reasons, there exists a need in the art for advanced systems and methods for data processing.

SUMMARY

Systems, circuits, devices and/or methods related to systems and methods for data processing, and more particularly to systems and methods for quality based scheduling processing of data sets.

Various embodiments of the present invention provide data processing systems that include: an input buffer and a process scheduling circuit. The data set is associated with a priority indication. The process scheduling circuit is operable to: select the data set for processing by a data detector circuit based at least in part on the priority indication where the data detector circuit is operable to apply a data detection algorithm to the data set to yield a detected output; and modify the priority indication based at least in part on a number of times the data set is processed through both the data detector circuit and a data decoder circuit where the data decoder circuit is operable to apply a data decode algorithm to a decoder input derived from the detected output to yield a decoded output.

This summary provides only a general outline of some embodiments of the invention. The phrases "in one embodiment," "according to one embodiment," "various embodiments", "one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1:
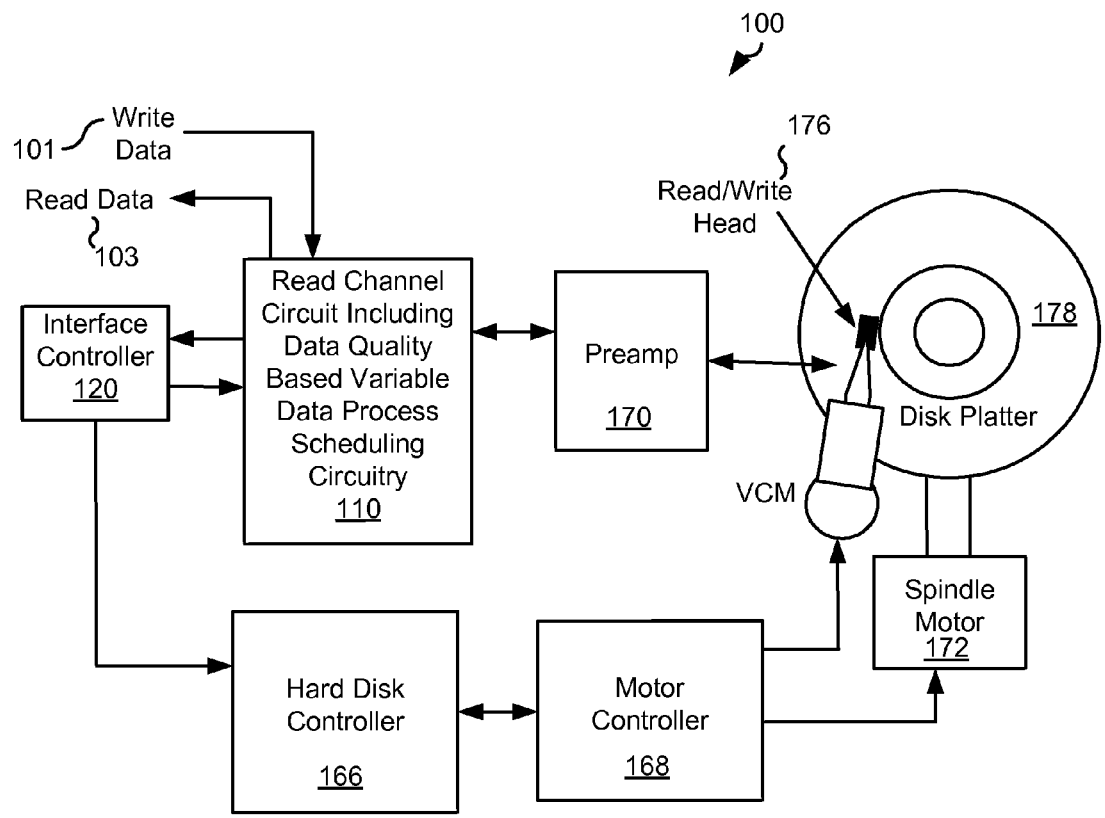
FIG. 1 shows a storage system including data quality based variable data process scheduling circuitry in accordance with various embodiments of the present invention.

Systems, circuits, devices and/or methods related to systems and methods for data processing, and more particularly to systems and methods for quality based scheduling processing of data sets.

Various embodiments of the present invention provide data processing systems that include: an input buffer and a process scheduling circuit. The data set is associated with a priority indication. The process scheduling circuit is operable to: select the data set for processing by a data detector circuit based at least in part on the priority indication where the data detector circuit is operable to apply a data detection algorithm to the data set to yield a detected output; and modify the priority indication based at least in part on a number of times the data set is processed through both the data detector circuit and a data decoder circuit where the data decoder circuit is operable to apply a data decode algorithm to a decoder input derived from the detected output to yield a decoded output. The data detector circuit may be, but is not limited to, a Viterbi algorithm data detector circuit, or a maximum a posteriori data detector circuit. In various cases, the data decoder circuit is a low density parity check decoder circuit. In one or more cases, the system is implemented as an integrated circuit. In some cases, the data processing systems are implemented in a storage device. In other cases, the data processing systems are implemented in a data transmission device.

Processing through both the data detector circuit and the data decoding circuit is considered a "global iteration". The data decoding circuit may repeatedly apply a data decoding algorithm to a processing data set during a given global iterations. Each application of the data decoding algorithm during a given global iteration is referred to as a "local iteration".

In some instances of the aforementioned embodiments, the data processing system further includes a quality metric determination circuit operable to determine the priority indication based upon the data set. In some such instances where the data set is a first data set and the priority indication is a first priority indication, the input buffer is further operable to maintain a second data set, and the second data set is associated with a second priority indication. Modifying the first priority indication based at least in part on the number of times the first data set is processed through both the data detector circuit and a data decoder circuit includes setting the first priority indication to a lower priority that the second priority indication.

In various instances of the aforementioned embodiments, the priority indication prior to modification by the process scheduling circuit is a quality metric calculated based upon the data set. In some such instances where the data detection algorithm is a first data detection algorithm, the systems further include a quality metric determination circuit having: a loop detector circuit operable to apply a second data detection algorithm to the data set to yield an interim detected output; a summation circuit operable to determine differences between corresponding instances of the interim detected output and the data set; and a mean squared error calculation circuit operable to calculate the quality metric as the mean squared error across the differences between corresponding instances of the interim detected output and the data set. In some cases, the quality metric is a detect quality metric, and the process scheduling circuit is operable to select the data set for processing though the data detector circuit and the data decoder circuit based at least in part on a decode quality metric after the data set has previously been processed through the data decoder circuit. The decode quality metric may correspond to a number of errors remaining after application of the data decode algorithm to the decoder input derived from the data set. In some cases, the errors are unsatisfied parity equations.

Other embodiments of the present invention provide methods for data processing. The methods include: storing a data set to an input buffer where the data set is associated with a priority indication; selecting the data set for processing by a data detector circuit based at least in part on the priority indication where the data detector circuit is operable to apply a data detection algorithm to the data set to yield a detected output; and modifying the priority indication based at least in part on a number of times the data set is processed through both the data detector circuit and a data decoder circuit where the data decoder circuit is operable to apply a data decode algorithm to a decoder input derived from the detected output to yield a decoded output.

Turning to FIG. 1, a storage system 100 including a read channel circuit 110 having data quality based variable data process scheduling circuitry in accordance with various embodiments of the present invention is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

As part of processing the received information, read channel circuit 110 utilizes quality based priority scheduling circuitry that operates to prioritize application of processing cycles to higher quality codewords over lower quality codewords. Such prioritizing is modified for high global iteration data sets to re-prioritize the high global iteration data sets such that the data sets are re-processed during transitional periods when excess processing bandwidth may become available. In some cases, read channel circuit 110 may be implemented to include a data processing circuit similar to that discussed below in relation to FIG. 3. Further, the prioritizing and re-prioritizing of codeword processing may be accomplished consistent with one of the approaches discussed below in relation to FIGS. 4a-4b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
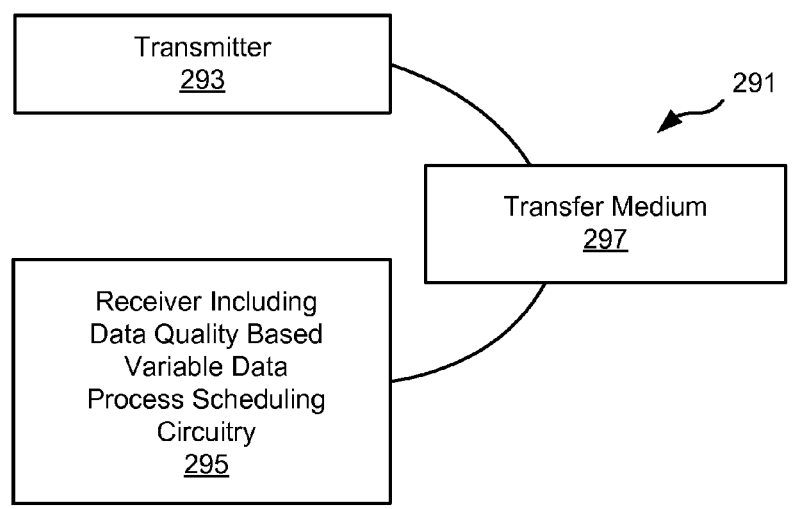
FIG. 2 depicts a data transmission system including data quality based variable data process scheduling circuitry in accordance with one or more embodiments of the present invention.

Turning to FIG. 2, a data transmission system 291 including a receiver 295 having parallel retry processing circuitry is shown in accordance with various embodiments of the present invention. Data transmission system 291 includes a transmitter 293 that is operable to transmit encoded information via a transfer medium 297 as is known in the art. The encoded data is received from transfer medium 297 by a receiver 295. Receiver 295 processes the received input to yield the originally transmitted data.

As part of processing the received information, receiver 295 utilizes quality based priority scheduling circuitry that operates to prioritize application of processing cycles to higher quality codewords over lower quality codewords. Such prioritizing is modified for high global iteration data sets to re-prioritize the high global iteration data sets such that the data sets are re-processed during transitional periods when excess processing bandwidth may become available. In some cases, receiver 295 may be implemented to include a data processing circuit similar to that discussed below in relation to FIG. 3. Further, the prioritizing and re-prioritizing of codeword processing may be accomplished consistent with one of the approaches discussed below in relation to FIGS. 4a-4b.

Figure 3:
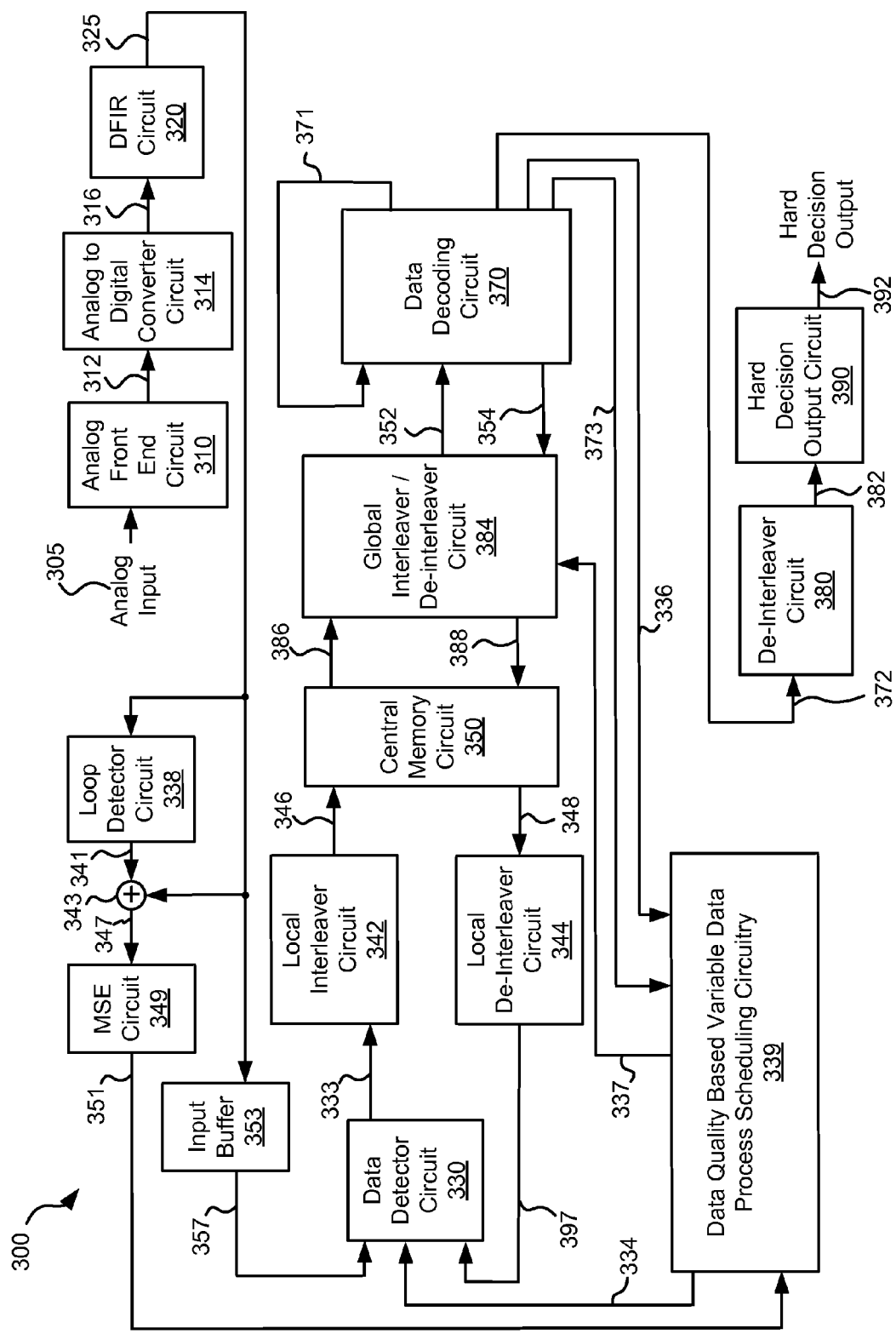
FIG. 3 shows a data processing circuit including a data quality based variable data process scheduling circuit in accordance with some embodiments of the present invention.

Turning to FIG. 3, a processing circuit 300 including a data quality based variable data process scheduling circuit 339 in accordance with some embodiments of the present invention. Data processing circuit 300 includes an analog front end circuit 310 that receives an analog signal 305. Analog front end circuit 310 processes analog signal 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 305 is derived from a read/write head assembly (not shown) that is disposed in relation to a storage medium (not shown). In other cases, analog signal 305 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 305 may be derived.

Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 316 are provided to an equalizer circuit 320. Equalizer circuit 320 applies an equalization algorithm to digital samples 316 to yield an equalized output 325. In some embodiments of the present invention, equalizer circuit 320 is a digital finite impulse response filter circuit as are known in the art. It may be possible that equalized output 325 may be received directly from a storage device in, for example, a solid state storage system. In such cases, analog front end circuit 310, analog to digital converter circuit 314 and equalizer circuit 320 may be eliminated where the data is received as a digital data input. Equalized output 325 is stored to an input buffer 353 that includes sufficient memory to maintain one or more codewords until processing of that codeword is completed through a data detector circuit 330 and a data decoding circuit 370 including, where warranted, multiple global iterations (passes through both data detector circuit 330 and data decoding circuit 370) and/or local iterations (passes through data decoding circuit 370 during a given global iteration). An output 357 is provided to data detector circuit 330.

Data detector circuit 330 may be a single data detector circuit or may be two or more data detector circuits operating in parallel on different codewords. Whether it is a single data detector circuit or a number of data detector circuits operating in parallel, data detector circuit 330 is operable to apply a data detection algorithm to a received codeword or data set. In some embodiments of the present invention, data detector circuit 330 is a Viterbi algorithm data detector circuit as are known in the art. In other embodiments of the present invention, data detector circuit 330 is a is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 330 is used to apply the data detection algorithm to the received codeword for a first global iteration applied to the received codeword, and another data detector circuit included in data detector circuit 330 is operable apply the data detection algorithm to the received codeword guided by a decoded output accessed from a central memory circuit 350 on subsequent global iterations.

Upon completion of application of the data detection algorithm to the received codeword on the first global iteration, data detector circuit 330 provides a detector output 333. Detector output 333 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detected output 333 is provided to a local interleaver circuit 342. Local interleaver circuit 342 is operable to shuffle sub-portions (i.e., local chunks) of the data set included as detected output and provides an interleaved codeword 346 that is stored to central memory circuit 350. Interleaver circuit 342 may be any circuit known in the art that is capable of shuffling data sets to yield a re-arranged data set. Interleaved codeword 346 is stored to central memory circuit 350.

Once a data decoding circuit 370 is available, a previously stored interleaved codeword 346 is accessed from central memory circuit 350 as a stored codeword 386 and globally interleaved by a global interleaver/de-interleaver circuit 384. Global interleaver/De-interleaver circuit 384 may be any circuit known in the art that is capable of globally rearranging codewords. Global interleaver/De-interleaver circuit 384 provides a decoder input 352 into data decoding circuit 370. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. Data decoding circuit 370 applies a data decode algorithm to decoder input 352 to yield a decoded output 371. In cases where another local iteration (i.e., another pass trough data decoder circuit 370) is desired, data decoding circuit 370 re-applies the data decode algorithm to decoder input 352 guided by decoded output 371. This continues until either a maximum number of local iterations is exceeded or decoded output 371 converges.

Where decoded output 371 fails to converge (i.e., fails to yield the originally written data set) and a number of local iterations through data decoder circuit 370 exceeds a threshold, the resulting decoded output is provided as a decoded output 354 back to central memory circuit 350 where it is stored awaiting another global iteration through a data detector circuit included in data detector circuit 330. Prior to storage of decoded output 354 to central memory circuit 350, decoded output 354 is globally de-interleaved to yield a globally de-interleaved output 388 that is stored to central memory circuit 350. The global de-interleaving reverses the global interleaving earlier applied to stored codeword 386 to yield decoder input 352. When a data detector circuit included in data detector circuit 330 becomes available, a previously stored de-interleaved output 388 accessed from central memory circuit 350 and locally de-interleaved by a de-interleaver circuit 344. De-interleaver circuit 344 re-arranges decoder output 348 to reverse the shuffling originally performed by interleaver circuit 342. A resulting de-interleaved output 397 is provided to data detector circuit 330 where it is used to guide subsequent detection of a corresponding data set previously received as equalized output 325.

Alternatively, where the decoded output converges (i.e., yields the originally written data set), the resulting decoded output is provided as an output codeword 372 to a de-interleaver circuit 380. De-interleaver circuit 380 rearranges the data to reverse both the global and local interleaving applied to the data to yield a de-interleaved output 382. De-interleaved output 382 is provided to a hard decision output circuit 390. Hard decision output circuit 390 is operable to re-order data sets that may complete out of order back into their original order. The originally ordered data sets are then provided as a hard decision output 392.

As equalized output 325 is being stored to input buffer 353, a detect quality metric 351 of equalized output 325 is being determined. In particular, equalized output 325 is provided to a loop detector circuit 338 that applies a data detection algorithm to equalized output 325 to yield a detected output 341. In some embodiments of the present invention, loop detector circuit 338 is a simplified version of data detector circuit 330 that is operable to provide detected output 341 as a rough approximation of what detected output 333 will be when data detector circuit 330 applies the data detection algorithm to the same equalized output 325 pulled from input buffer 353. Based upon the disclosure provided herein, one of ordinary skill in the art will recognize a variety of data detector circuits that may be used in relation to different embodiments of the present invention. Detected output 341 is provided to a summation circuit 343 that is operable to subtract equalized output 325 from corresponding instances of detected output 341 to yield a series of error values 347.

Error values 347 are provided to a mean squared error (MSE) calculation circuit 349 that calculates a mean squared error across each codeword received as equalized output 325. The mean squared error value is provided as detect quality metric 351 to data quality based variable data process scheduling circuit 339. In such a case, a higher value of detect quality metric 351 indicates a lower quality. The mean squared error value is calculated in accordance with mean squared error calculations as are known in the art. Alternatively, another error calculation may be used such as, for example, an average error value across the entire codeword. Based upon the disclosure provided herein, one of ordinary skill in the art will recognize a variety of error calculations that may be used in relation to different embodiments of the present invention.

In addition, as codewords are processed through data decoding circuit 370, the number of remaining unsatisfied checks (i.e., the number of parity equations that could not be satisfied by the decoding algorithm) or errors in the codeword are reported to data quality based variable data process scheduling circuit 339 as a decode quality metric 373. The higher the number reported as decode quality metric 373 indicates a lower quality.

Data quality based variable data process scheduling circuit 339 receives detect quality metric 351, decode quality metric 373, and a number of global iterations 336 completed by data detecting circuit 330 and data decoding circuit 370 on the currently processing data set. Data quality based variable data process scheduling circuit 339 uses the received inputs to prioritize and re-prioritize the codewords to be processed by data detector circuit 330 and data decoder circuit 370. In one particular embodiment of the present invention, data quality based variable data process scheduling circuit 339 includes a global iteration count value register (not shown) for each codeword maintained in input buffer 353, a defect quality metric register (not shown) holding a detect quality metric 351 for each codeword maintained in input buffer 353, and a decode quality metric register (not shown) holding a decode quality metric 373 for each codeword maintained in input buffer 353.

In operation, when a codeword received as equalized output 325 is initially stored to input buffer 353 a global iteration count associated with the codeword is set equal to zero in the global iteration count value register, and detect quality metric 351 calculated by MSE circuit 349 for the codeword is stored to the defect quality metric register. Each time data decoding by the data decoding circuit 370 completes for a given global iteration, the global iteration count value for the codeword is incremented and decode quality metric 373 for the codeword is stored to the decode quality metric register. Data quality based variable data process scheduling circuit 339 prioritizes processing of the various codewords in accordance with the following rules.

First, where there are any instances of decoded output 354 in central memory circuit 350, data quality based variable data process scheduling circuit 339 determines whether the global iteration count for a codeword in input buffer 353 is greater than or equal to a defined limit. Where the global iteration count for a codeword is greater than or equal to the defined limit, the slot in central memory 350 where the decoded output corresponding to the codeword is released (i.e., the instance of the decode output 354 exhibiting a high global iteration count is effectively removed from central memory circuit 350) to allow for use by another data set and the global iteration count for the codeword still retained in input buffer 353 is set equal to a maximum. In some cases, the defined limit is seven. Based upon the disclosure provided herein, one of ordinary skill in the art will recognize a variety of numbers that may be used as the defined limit.

In addition, a location in a settings register (not shown) included in data quality based variable data process scheduling circuit 339 that is reserved for the codeword retained in input buffer 353 is updated to include settings different from those used during previous processing of the codeword. The settings controlled by the entry in the settings register may control, for example, a number of local iterations applied by data decoding circuit 370, a different scaling value applied by data decoding circuit 370, and/or different filter coefficients used by noise predictive filters included in data detector circuit. Based upon the disclosure provided herein, one of ordinary skill in the art will recognize a variety of settings in place of the aforementioned or in addition to one or more of the aforementioned that may be modified during subsequent processing in accordance with different embodiments of the present invention.

Second, where there are any instances of decoded output 354 in central memory circuit 350, the codeword in input buffer 353 corresponding to the instance of decoded output 354 in central memory circuit 350 exhibiting the lowest value of decode quality output 351 is selected for processing through data detector circuit 330 and data decoder circuit 370. Selection of codewords based upon decode quality output 351 inherently implies operation on a codeword that has already been processed through at least one global iteration. In such a case, processing involves accessing both the codeword from input buffer 353 and the corresponding instance of decoded output 354 from central memory circuit 350, and the processing of the codeword through data detector circuit 330 is done using the guidance of decoded output 354 which is provided to data detector circuit 330 via local de-interleaver circuit 342 as interleaved output 397. As any instance of decoded output 354 exhibiting a high global iteration count was effectively removed from central memory circuit 350 during the preceding process, such an instance cannot be selected for additional processing.

Third, where there are not any instances of decoded output 354 in central memory circuit 350, the codeword in input buffer 353 exhibiting the lowest value of detector quality metric 351 is selected for processing through data detector circuit 330 and data decoder circuit 370. Such an approach causes the highest quality codeword to receive priority. In such a case, processing by data detector circuit 330 is done without any guidance from a corresponding decoded output 354. Also, as any instance of decoded output 354 exhibiting a high global iteration count had its detector quality metric 351 set equal to a maximum value, it is almost impossible for it to be selected for further processing until other codewords being processed through the initial number of global iterations have been processed. As such, by setting the detector quality metric 351 for the codeword awaiting processing to a maximum value (i.e., indicating the lowest possible quality), data quality based variable data process scheduling circuit 339 effectively re-prioritizes the codeword by assuring that it is processed after other codewords with potentially higher likelihood of convergence are processed.

Selection of the next codeword in input buffer 353 for processing is accomplished via control of a codeword selector output 334. In particular, data quality based variable data process scheduling circuit 339 asserts codeword selector output 334 to data detector circuit 330 causing it to access the desired codeword for processing.

Figure 4A:
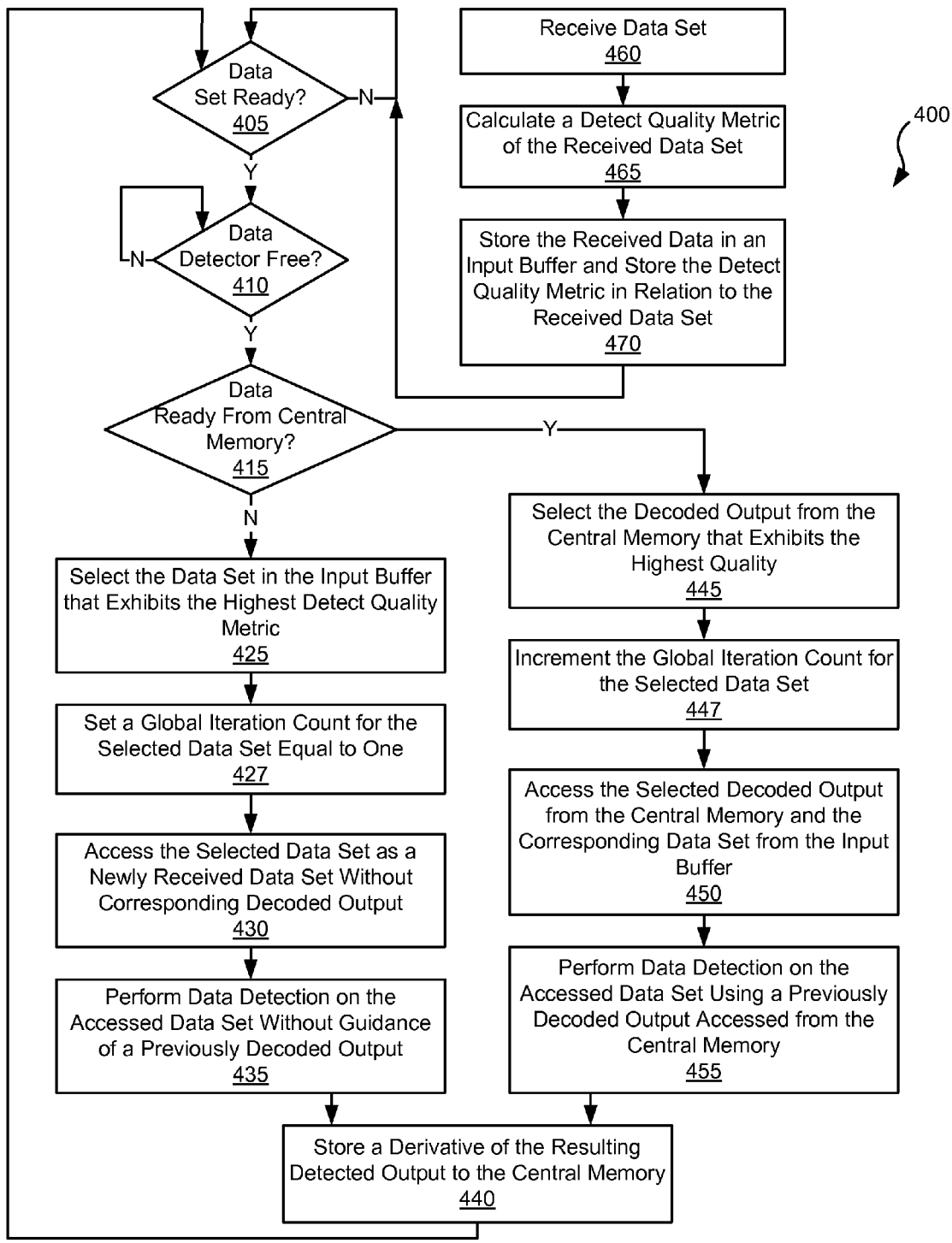
FIGS. 4a-4b are flow diagrams showing a method for data quality based variable data process scheduling in accordance with some embodiments of the present invention.

FIG. 4a is a flow diagram 400 showing a method for data quality based variable data process scheduling in accordance with some embodiments of the present invention. Following flow diagram 400 a data set is received (block 460). This data set may be derived or received from, for example, a storage medium or a communication medium. As the data set is received, a detect quality metric is calculated for the data set (block 465). This calculation may include, for example, applying a data detection algorithm or processed to the data set to yield a detected output, and subtracting the detected output from corresponding instances of the received data set to yield an error. The resulting series of errors are then used to calculate a mean squared error value across a number of instances corresponding to a codeword. The mean squared error value is the detect quality metric. Based upon the disclosure provided herein, one of ordinary skill in the art will recognize other priority metrics that may be used in relation to different embodiments of the present invention. The received data set is stored in an input buffer and the detect quality metric is stored in relation to the received data set (block 470).

It is repeatedly determined whether a data set is ready for processing (block 405). A data set may become ready for processing where either the data set was previously processed and a data decode has completed in relation to the data set and the respective decoded output is available in a central memory, or where a previously unprocessed data set becomes available in the input buffer. Where a data set is ready (block 405), it is determined whether a data detector circuit is available to process the data set (block 410).

Where the data detector circuit is available for processing (block 410), it is determined whether there is a decoded output in the central memory that is ready for additional processing (block 415). Where there is a decoded output available in the central memory (block 415), the available decoded output in the central memory that exhibits the highest quality is selected (block 445). The highest quality is the decoded output that corresponds to a decode quality metric (see block 441) with the lowest value that has not been released from the central memory (see block 451). In some cases, only one decoded output is available in the central memory. In such cases, the only available decoded output is selected. In addition, the global iteration count for the selected data set is incremented to indicate another global iteration (block 447).

The data set corresponding to the selected decoded output is accessed from the input buffer and the selected decoded output is accessed from the central memory (block 450), and a data detection algorithm is applied to the data set (i.e., the second or later global iteration of the data set) using the accessed decoded output as guidance (block 455). Application of the data detection algorithm yields a detected output. In some cases, the data detection algorithm is a Viterbi algorithm data detector circuit or a maximum a posteriori data detector circuit. Application of the data detection algorithm yields a detected output. A derivative of the detected output is stored to the central memory (block 440) to await further processing by a data decoding circuit. The derivative of the detected output may be, for example, an interleaved or shuffled version of the detected output.

Alternatively, where there is not a decoded output in the central memory (block 415), the data set in the input buffer that exhibits the highest quality is selected (block 425). The highest quality is the data set that corresponds to the detect quality metric with the lowest value. In some cases, only one previously unprocessed data set is available in the input buffer. In such cases, the only available data set is selected. In addition, the global iteration count for the selected data set is set equal to one indicating the first global iteration for the data set (block 427). The selected data set is accessed from the input buffer as a newly received data set (block 430) and a data detection algorithm is applied to the newly received data set (i.e., the first global iteration of the data set) without guidance of a previously decoded output (block 435). Again, in some cases, the data detection algorithm is a Viterbi algorithm data detector circuit or a maximum a posteriori data detector circuit. Application of the data detection algorithm yields a detected output. A derivative of the detected output is stored to the central memory (block 440). The derivative of the detected output may be, for example, an interleaved or shuffled version of the detected output.

Figure 4B:
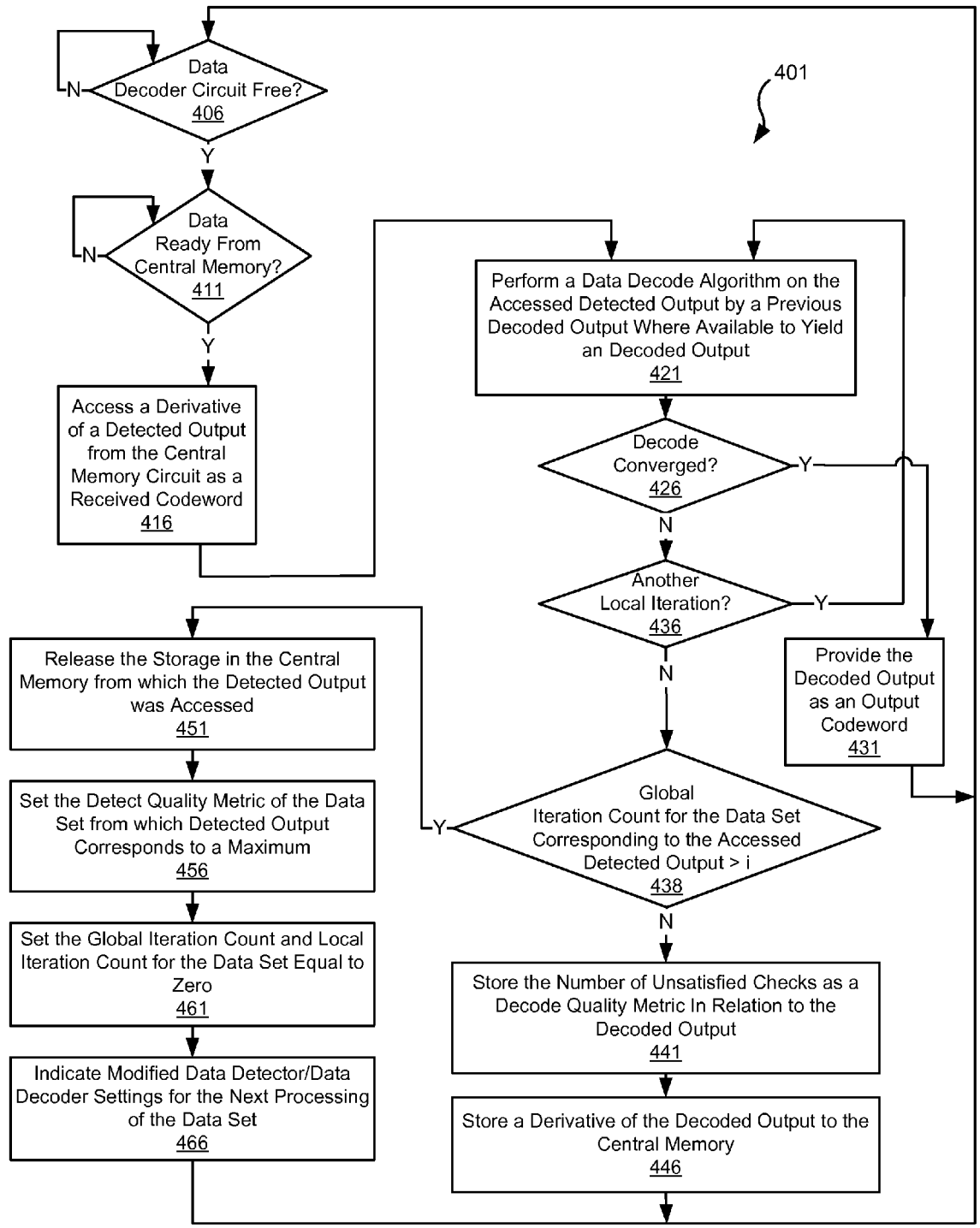

Turning to FIG. 4b, a flow diagram 401 shows a counterpart of the method described above in relation to FIG. 4a. Following flow diagram 401, in parallel to the previously described data detection process of FIG. 4a, it is determined whether a data decoder circuit is available (block 406). The data decoder circuit may be, for example, a low density data decoder circuit as are known in the art. Where the data decoder circuit is available (block 406), it is determined whether a derivative of a detected output is available for processing in the central memory (block 411). Where such a data set is ready (block 411), the previously stored derivative of a detected output is accessed from the central memory and used as a received codeword (block 416). A data decode algorithm is applied to the received codeword to yield a decoded output (block 421). Where a previous local iteration has been performed on the received codeword, the results of the previous local iteration (i.e., a previous decoded output) are used to guide application of the decode algorithm. In some embodiments of the present invention, the decode algorithm is a low density parity check decode algorithm.

It is then determined whether the decoded output converged (i.e., resulted in the originally written data) (block 426). Where the decoded output converged (block 426), it is provided as an output codeword (block 431). Alternatively, where the decoded output failed to converge (block 426), it is determined whether another local iteration is desired (block 436). In some cases, seven local iterations are allowed per each global iteration. Based upon the disclosure provided herein, one of ordinary skill in the art will recognize another number of local iterations that may be used in relation to different embodiments of the present invention. Where another local iteration is desired (block 436), the processes of blocks 421-436 are repeated for the codeword. Alternatively, where another local iteration is not desired (i.e., the allowable number of local iterations are exceeded) (block 436), it is determined whether a global iteration count for the data set corresponding to the accessed detected output exceeds a defined number, i (block 438). In some embodiments of the present invention, the defined number is six. Based upon the disclosure provided herein, one of ordinary skill in the art will recognize a variety of values for the defined number that may be used in relation to different embodiments of the present invention.

Where the number of global iterations does not exceed the defined number (i.e., more global iterations remain) (block 438), the number of unsatisfied checks resulting at the end of the data decoding are stored as the decode quality metric in relation to the decoded output (block 441), and a derivative of the decoded output is stored to the central memory (block 446). The derivative of the decoded output being stored to the central memory triggers the data set ready query of block 405 to begin the data detection process.

Alternatively, where the number of global iterations exceeds the defined number (i.e., no more global iterations remain) (block 438), the storage slot in the central memory used in relation to the currently processing data set is released to allow its use by another data set (block 451). In addition, the detect quality metric of the data set from which the detected output is derived is set to a maximum (block 456). Setting the detect quality metric of the data set equal to a maximum value assures that, while the data set continues to be maintained in the input buffer, it will not be selected for reprocessing until there are not any data sets in the input buffer that have not been processed at least once first. In addition, the global iteration count and the local iteration count for the recently processed data set that is still retained in the input buffer are set equal to zero in preparation for its later processing (block 461). Further, modified settings for one or both of the data detector circuit and the data decoder circuit are selected for use when the for the recently processed data set that is still retained in the input buffer is re-processed (block 466). The modified settings may include, for example, a number of local iterations applied by the data decoding circuit, a different scaling value applied by data decoding circuit, and/or different filter coefficients used by noise predictive filters included in data detector circuit. Based upon the disclosure provided herein, one of ordinary skill in the art will recognize a variety of settings in place of the aforementioned or in addition to one or more of the aforementioned that may be modified during subsequent processing in accordance with different embodiments of the present invention.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for priority based data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
   an integrated circuit implemented in hardware further comprising:
      an input buffer operable to maintain a plurality of data sets derived from a same storage medium, wherein each of the plurality of data set sets is associated with a respective priority indication; and
      a process scheduling circuit operable to:
         select one of the plurality of data sets for processing by a data detector circuit based at least in part on the priority indication associated with the one of the plurality of data sets, wherein the data detector circuit is operable to apply a data detection algorithm to the one of the plurality of data sets to yield a detected output; and
         modify the priority indication based at least in part on a number of times the one of the plurality of data sets is processed through both the data detector circuit and a data decoder circuit, wherein the data decoder circuit is operable to apply a data decode algorithm to a decoder input derived from the detected output to yield a decoded output.

2. The data processing system of claim 1, wherein the data processing system further comprises:
   a quality metric determination circuit operable to determine the priority indication based upon a determined quality of the one of the plurality of data sets.

3. The data processing system of claim 2, wherein the one of the plurality of data sets is a first data set, wherein the priority indication associated with the first data set is a first priority indication, and wherein:
   the plurality of data sets includes a second data set, wherein the second data set is associated with a second priority indication; and
   wherein modifying the first priority indication based at least in part on the number of times the first data set is processed through both the data detector circuit and a data decoder circuit includes setting the first priority indication to a lower priority than the second priority indication.

4. The data processing system of claim 1, wherein the priority indication prior to modification by the process scheduling circuit is a quality metric calculated based upon the one of the plurality of data sets.

5. The data processing system of claim 4, wherein the data detection algorithm is a first data detection algorithm, and wherein the system further comprises:
   a quality metric determination circuit including:
      a loop detector circuit operable to apply a second data detection algorithm to the one of the plurality of data sets to yield an interim detected output;
      a summation circuit operable to determine differences between corresponding instances of the interim detected output and the one of the plurality of data sets; and
      a mean squared error calculation circuit operable to calculate the quality metric as the mean squared error across the differences between corresponding instances of the interim detected output and the one of the plurality of data sets.

6. The data processing system of claim 4, wherein quality metric is a detect quality metric, and wherein the process scheduling circuit is operable to select the one of the plurality of data sets for processing though the data detector circuit and the data decoder circuit based at least in part on a decode quality metric after the data set has previously been processed through the data decoder circuit.

7. The data processing system of claim 6, wherein the decode quality metric corresponds to a number of errors remaining after application of the data decode algorithm to the decoder input derived from the plurality of data sets.

8. The data processing system of claim 7, wherein the errors are unsatisfied parity equations.

9. The data processing system of claim 1, wherein the data detector circuit is selected from a group consisting of: a Viterbi algorithm data detector circuit, and a maximum a posteriori data detector circuit.

10. The data processing system of claim 1, wherein the data decoder circuit is a low density parity check decoder circuit.

11. The data processing system of claim 1, wherein the data processing system is incorporated in a device selected from a group consisting of: a storage device, and a data transmission device.

12. A method for data processing, the method comprising:
   storing a plurality of data sets to an input buffer, wherein each of the plurality of data sets is associated with a respective priority indication;
   selecting one of the plurality of data sets for processing by a data detector circuit based at least in part on the priority indication associated with the one of the plurality of data sets, wherein the data detector circuit is operable to apply a data detection algorithm to one of the plurality of data sets to yield a detected output; and
   modifying the priority indication based at least in part on a number of times the one of the plurality of data sets is processed through both the data detector circuit and a data decoder circuit, wherein the data decoder circuit is operable to apply a data decode algorithm to a decoder input derived from the detected output to yield a decoded output.

13. The method of claim 12, wherein the priority indication is a quality metric, and wherein the method further comprises:
   calculating the quality metric based upon the one of the plurality of data sets prior to processing the decoder input derived from the detected output through the data decoder circuit.

14. The method of claim 13, wherein the data detection algorithm is a first data detection algorithm, and wherein the method further comprises:
   applying a second data detection algorithm to the one of the plurality of data sets to yield an interim detected output;
   calculating a difference set between corresponding instances of the interim detected output and the one of the plurality of data sets; and
   wherein the quality metric corresponds to the difference set.

15. The method of claim 14, wherein the method further comprises:
   calculating a mean squared error based on the difference set, wherein the value of the quality metric is the mean squared error.

16. The method of claim 13, wherein the quality metric is a detect quality metric, and wherein selecting the one of the plurality of data sets is based at least in part on a decode quality metric associated with the one of the plurality of data sets after the one of the plurality of data sets has been previously processed by the data decoder circuit.

17. The method of claim 16, wherein the decode quality metric corresponds to a number of unsatisfied checks remaining after application of the data decode algorithm to the decoder input derived from the one of the plurality of data sets.

18. The data processing system of claim 12, wherein the data decoder circuit is a low density parity check decoder circuit, and wherein the data detector circuit is selected from a group consisting of: a Viterbi algorithm data detector circuit, and a maximum a posteriori data detector circuit.

19. A storage device, the storage device comprising: a storage medium;
   a head assembly disposed in relation to the storage medium and operable to provide a sensed signal corresponding to information on the storage medium; a read channel circuit including:
   an analog to digital converter circuit operable to sample an analog signal derived from the sensed signal to yield a series of digital samples;
   an equalizer circuit operable to equalize the digital samples to yield a plurality of data sets;
   an input buffer operable to maintain at least the plurality of data sets, wherein each of the plurality of data sets is associated with a respective priority indication;
   a process scheduling circuit operable to:
      select one of the plurality of data sets for processing by a data detector circuit based at least in part on the priority indication associated with the one of the plurality of data sets, wherein the data detector circuit is operable to apply a data detection algorithm to the one of the plurality of data sets to yield a detected output; and
      modify the priority indication based at least in part on a number of times the one of the plurality of data sets is processed through both the data detector circuit and a data decoder circuit, wherein the data decoder circuit is operable to apply a data decode algorithm to a decoder input derived from the detected output to yield a decoded output.

* * * * *